May 13, 1924.

G. R. WOOD 1,494,091

COMPUTING SCALE

Filed Jan. 28, 1921    4 Sheets-Sheet 1

May 13, 1924.
G. R. WOOD
1,494,091
COMPUTING SCALE
Filed Jan. 28, 1921   4 Sheets-Sheet 2
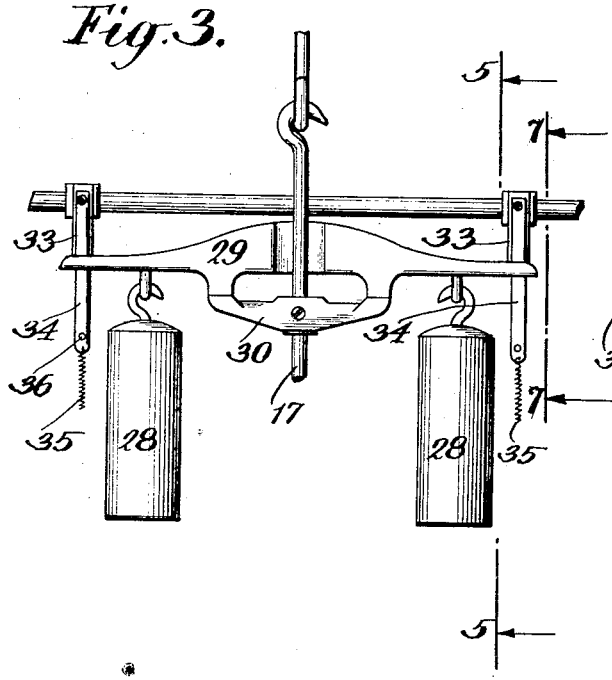
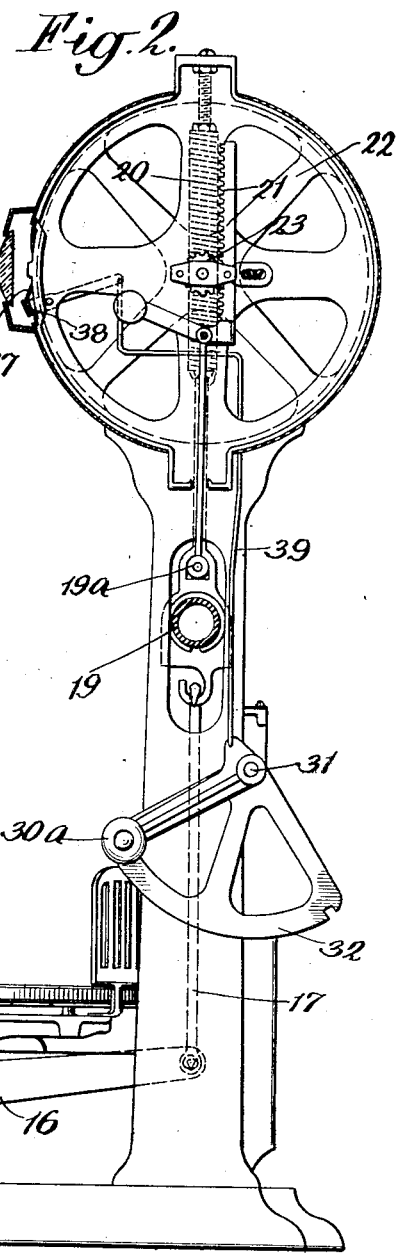
Inventor
George R. Wood.
By her Attorneys
Kerr, Page, Cooper & Hayward May 13, 1924.
G. R. WOOD
COMPUTING SCALE
Filed Jan. 28, 1921    4 Sheets-Sheet 3
1,494,091
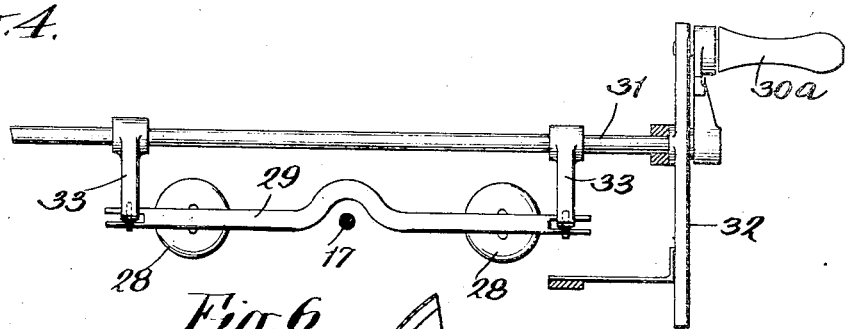
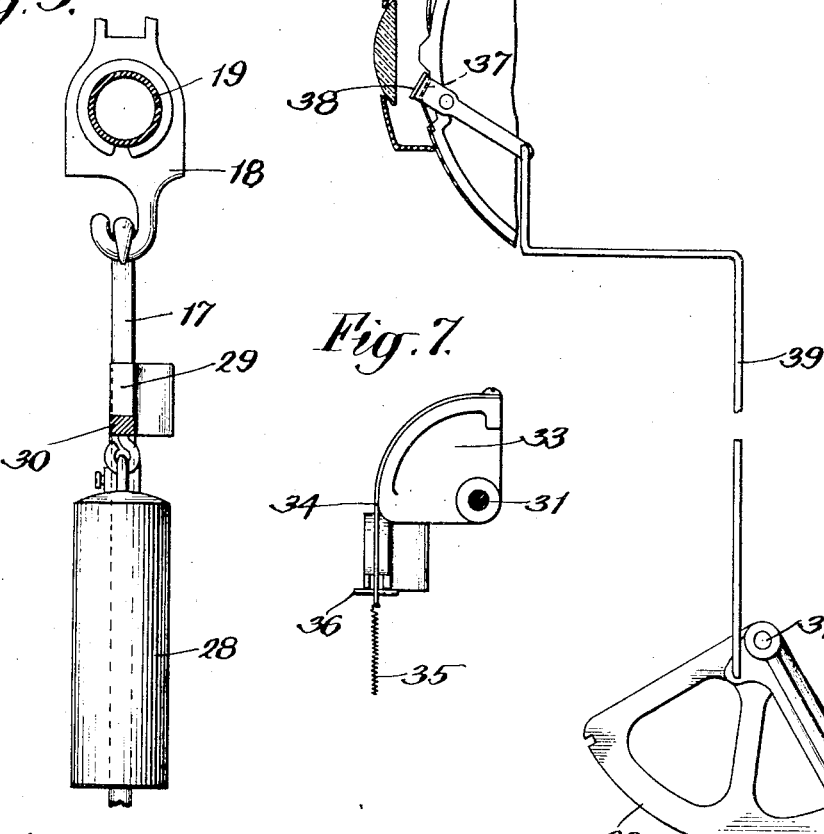
Inventor
George R Wood
By his Attorneys
Kerr Page Cooper & Hayward May 13, 1924.　　　　　　　　　　　　　　　1,494,091
G. R. WOOD
COMPUTING SCALE
Filed Jan. 28, 1921　　　4 Sheets-Sheet 4

Inventor
George R Wood
By his Attorney
Kerr Page Cooper & Hayward

Patented May 13, 1924.

1,494,091

UNITED STATES PATENT OFFICE.

GEORGE R. WOOD, OF DAYTON, OHIO, ASSIGNOR, BY MESNE ASSIGNMENTS, TO DAYTON SCALE COMPANY, OF DAYTON, OHIO, A CORPORATION OF NEW JERSEY.

COMPUTING SCALE.

Application filed January 28, 1921. Serial No. 440,580.

*To all whom it may concern:*

Be it known that I, GEORGE R. WOOD, a subject of the King of Great Britain, residing at Dayton, in the county of Montgomery and State of Ohio, have invented certain new and useful Improvements in Computing Scales, of which the following is a full, clear, and exact description.

This invention relates to improvements in computing scales of the drum type and has for its objects the provision of means for increasing the price range of the scale.

Computing scales of the drum type comprise a rotarily mounted indicating drum, a load counterbalancing means and suitable operating connections between the load support and the drum and the counterbalancing means to cause the drum to be displaced to variable angular extents in accordance with variable loads. The drum is made as light as possible to minimize inertia and friction and generally consists of a series of light weight spiders which carry a cylindrical paper chart on its periphery. This chart is graduated with a series of weight graduations and with a plurality of series of price graduations. The price graduations corresponding to different prices are arranged side by side and a suitable fixed indicator is provided to indicate the price per unit corresponding to each price graduation scale on the drum. The number of price graduations upon the drum and the number of prices per pound for which the device is adapted are limited primarily by the width of the drum and the size of the figures upon each price graduation scale. A material increase of width of the drum over the width now commonly used is not practicable inasmuch as the weight and inertia of the drum would be so increased as to preclude accurate weighing. The closer spacing of the price graduations is likewise impracticable inasmuch as the legibility of the graduations would be seriously impaired.

These factors have caused manufacturers to make separate charts and indicator scales for varying price ranges and have in many cases necessitated the use of two scales where one would suffice if provided with the necessary range of prices.

The present invention has for its object the provision of a construction which will enable one part of the chart; namely, a fractional angular portion thereof, to be used for one set of prices and another angular portion thereof to be used for a second set of prices.

Further objects and advantages will be more fully set forth in the accompanying specification and claims and shown in the drawings in which:

Fig. 2 shows an end elevation of the scale with certain parts shown in section to show the interior construction.

Fig. 3 is a detail front view of a portion of the mechanism, shown in Fig. 1, which changes the drum position when a different price range is desired.

Fig. 4 is a top view of the same mechanism and shows the operating crank therefor.

Fig. 5 is an end sectional view taken on line 5—5 of Fig. 3.

Fig. 6 is a detail view showing the operating connections from the setting handle to the price indicator scale.

Fig. 7 is a detail view taken on line 7—7 of Fig. 3.

Fig. 8 is a detail view of certain of the parts shown in Fig. 7.

Figure 10:
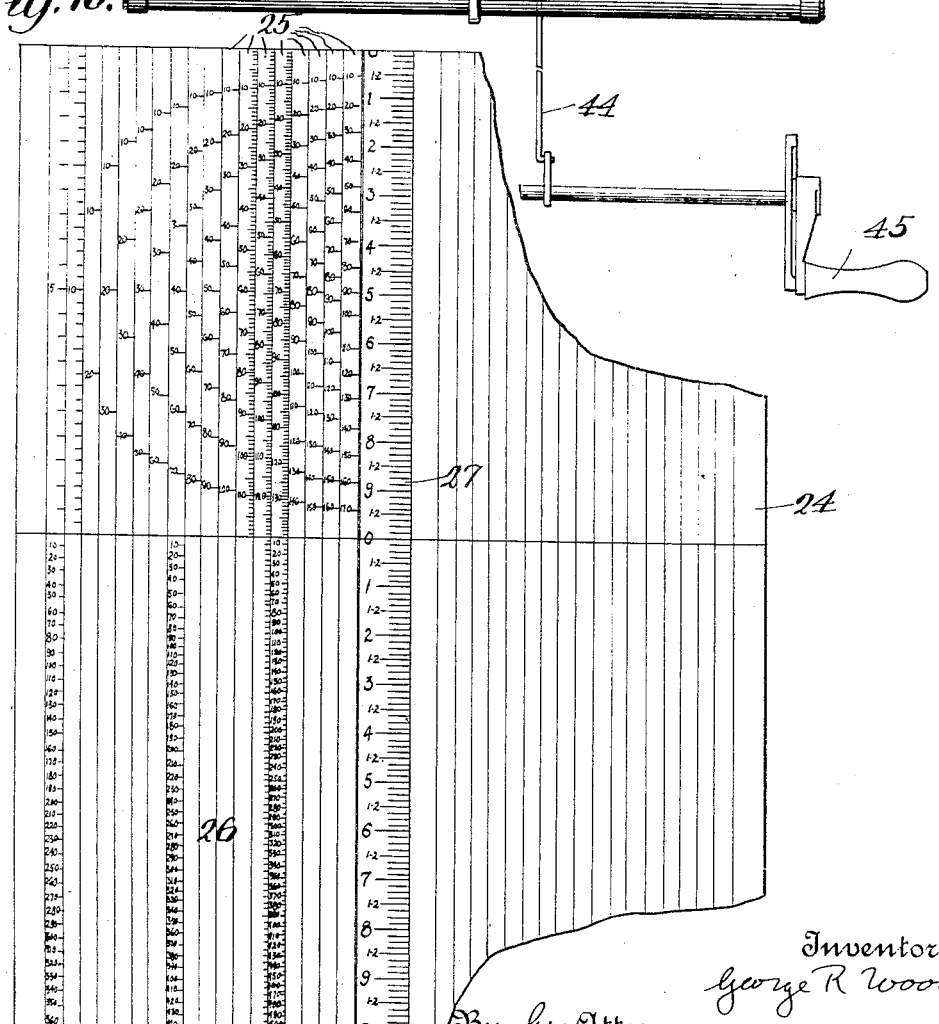
Fig. 10 is a diagrammatic view showing the arrangement of the multiple price graduations upon the chart.

The scale to which my invention is shown applied is of the type generally known to the trade as a Dayton 63 scale. The invention is not limited in its application to that type of scale but may be used with any of the drum scales now on the market. The scale here shown comprises a load support or platform 15 supported upon a base lever 16 which through steelyard 17, connection 18, thermostatic and equalizer bars 19 and 19$^a$, connects to the springs 20 and to the indicator operating racks 21. The springs are supported in the drum housing in the usual manner and the rotary drum 22 is suitably mounted for rotation therein and provided with pinions 23 engaging the racks 21, attached to the drum spiders in the paper chart 24 (Fig. 10).

For convenience in explanation it will be assumed that the load counterbalancing springs 20 are so proportioned that the drum will make one complete revolution upon the application of a 20-pound load to the platform. To increase the price range I provide the chart with two sets of price graduations. One set marked 25 extends from the zero point of the chart to the 10-pound point. The other set 26 commences at this point and extends to the 20-pound point. The weight graduations 27 extend from 0 to 10 as usual and at 10 recommence and increase as from 0 to 10 up to the 20 pound point. In the particular embodiment here shown the weight capacity has been decreased one-half to increase the price capacity. Any desired ratio may be used depending upon the prices desired. For example, the first set of price scales 25 could be used for the first 15 pounds and the second set 26 for the last five pounds.

In order to utilize the chart arrangement described, means must be provided for readjusting the zero position of the chart when the price range is to be changed.

In one embodiment of the invention I provide capacity weights 28 carried by a saddle 29. This saddle is adapted to be lowered to or raised from a position of support by a bracket 30 carried by the draft rod 17. When lowered the weight of the saddle itself and of the weights 28 is such that the springs are extended and the drum rotated to bring the indicating line into alignment with the intermediate zero on chart 24.

To effect this manipulation I provide a handle 30ª fastened to shaft 31 and retained in desired position by a notched sector 32. Fixed upon shaft 31 are two cams 33 which have fastened thereto tapes 34 which extend vertically downwardly and connect with springs 35. The tapes extend through slots in ends of the saddle (see Figs. 4, 7 and 8) and carry pins 36 which, upon the clockwise rocking of the cams by shaft 31 are adapted to contact with the saddle and elevate the same. When the saddle is to be lowered the handle and connected parts are manipulated in reverse direction thereby allowing the pins to move under the influence of the springs a substantial distance below the bottom of the saddle and allowing subsequent unrestricted movement of the same and of the scale parts associated therewith.

When the first section 25 of the price chart is being used the price per pound graduations are read from a fixed indicating scale 37, Figs. 1, 2, 6 and 10. When the handle is manipulated to bring the second section 26 of the price chart to reading position the scale 37 is obscured by a shutter 38 which carries a set price per pound indications corresponding to the section 26 of the chart (see Figs. 1, 6 and 10). The shutter 38 is preferably pivotally mounted as shown in Fig. 6 and is interconnected to the handle mechanism by linkage 39.

Figure 1:
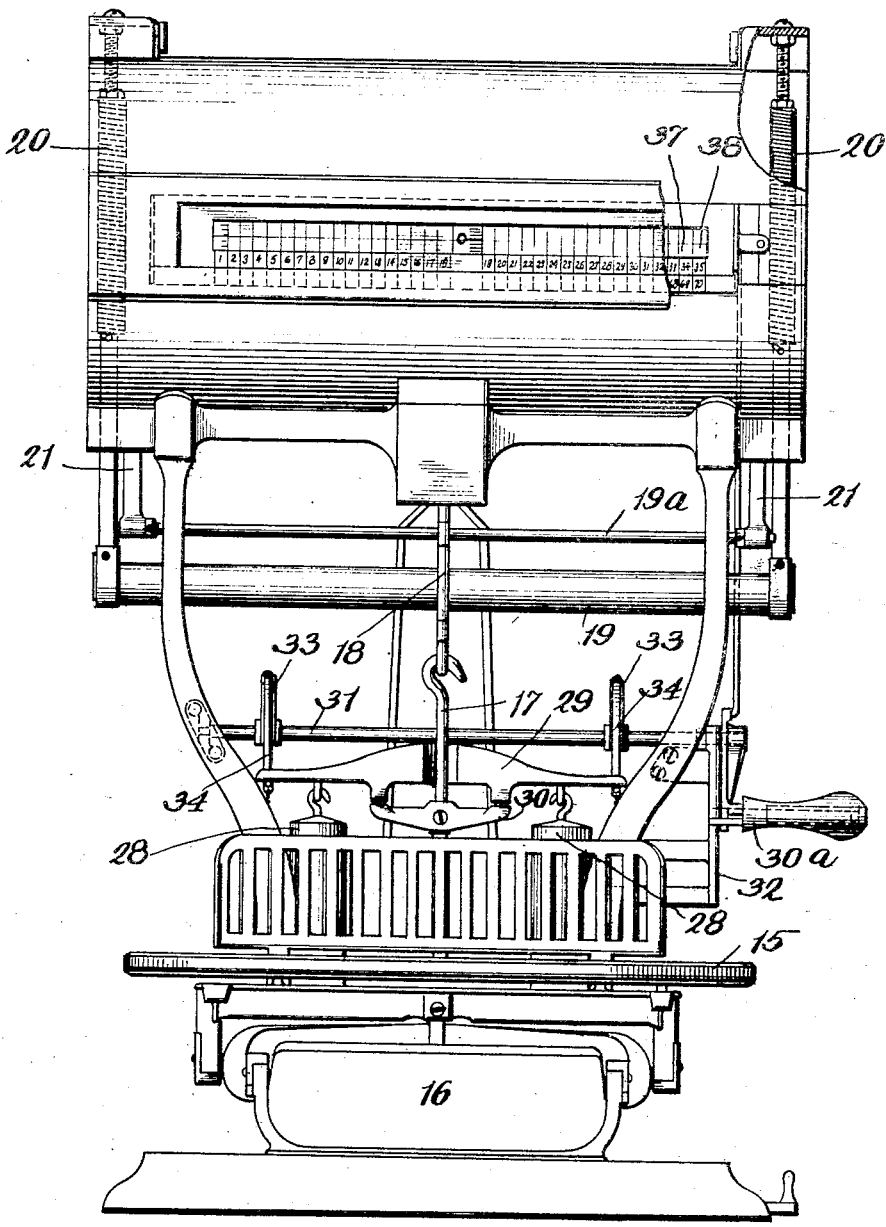
Figure 1 shows a front elevation of the scale.
Figure 9:
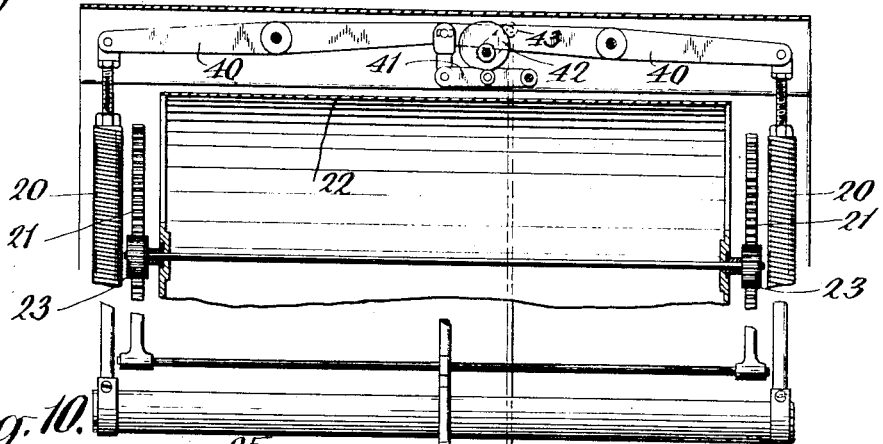
Fig. 9 is a front sectional view of a modified construction.

In lieu of depositing or removing weights from the draft rod and thereby imposing additional dead load upon the springs I may utilize the construction shown in Fig. 9. In this construction the springs 20 are provided with an adjustable support for their upper ends and by manipulation of this support the drum can be caused to rotate backwards from the intermediate zero position to the normal zero position. To attain this result I provide a pair of pivoted levers 40 which at one end connect with the springs 20 and at the other connect with a cam follower 41 which cooperates with cam 42. This cam is suitably interconnected with the operating handle as by a linkage 43—44 and bell crank 45.

The arrangement and timing of the cam is such that for normal operations, the upper ends of the springs 20 are elevated thereby aligning the initial zero of the chart with the indicating line. By manipulating the handle 30 the point of support of the springs is lowered, thereby lowering the racks 21 to a sufficient extent to cause the chart to rotate angularly sufficiently to bring the second zero on the chart into reading position and into alignment with the indicating wire. In the illustrated embodiment shown in Fig. 9 the parts are shown in the last mentioned displaced condition with the point of spring support lowered.

With the mechanism just described the imposing of a dead load upon the springs is avoided. Furthermore the wear of the rack is distributed over a longer length of rack, thereby diminishing the amount of error due to backlash resulting from wear.

It will be understood that the shutter arrangement heretofore described for indicating the price scale will be likewise employed with the construction shown in Fig. 9.

Where desired a blank space may be provided at the ends of the chart sections so as to distinctly separate the sections of the chart from each other. This feature is required by the departments of weights and measures in certain countries. When the blank space is provided the adjusting devices would be arranged to take this space in account in changing from one to the other section of the chart.

I claim:—

1. In a weighing scale, in combination, a chart having a plurality of sets of price indications thereon, one of said sets for a certain price per unit of weight extending from the normal zero partially around the chart, and a second of said sets for another price per unit of weight extending from a zero point angularly spaced from the zero of the first set around another portion of the chart, and means for angularly adjusting the position of the chart relatively to a fixed indicating point, whereby one or the other set of price indications may be utilized as desired.

2. In a weighing scale, in combination, a rotary chart, said chart having a plurality of sets of price-indicating graduations, one of said sets corresponding to one set of prices and another set corresponding to another independent set of prices, means for displacing the chart in accordance with the weight of the goods weighed, and manually operable means for controlling displacing of the chart so as to bring one or the other of said sets of price graduations on the chart into reading position whereby, upon the displacement thereof by the load, the reading may be taken from one or the other portion of the said chart.

3. In a weighing scale, in combination, a rotary chart having a plurality of sets of price graduations angularly displaced on the periphery thereof relatively to each other, one of said sets having the zero point thereof disposed following the termination of the graduations of the other set, means for setting the chart to bring the zero point of either set to reading position, and means for displacing the said chart in accordance with the applied load whereby the price reading may be taken from either set of price graduations in accordance with the setting which has been made.

4. In a weighing scale, in combination, a chart having a plurality of sets of price graduations thereon, one of said sets extending from the normal zero of the chart partially around the same and a second set extending around another portion of the chart, means for angularly adjusting the position of chart relatively to the reading point, means adjacent the reading point for displaying price indications per unit of weight for the various price graduation scales, and means for changing the display of the said price indications per unit of weight when the first mentioned means is adjusted to vary the chart position whereby the price per unit indication is adapted to correspond with the particular set of price scales at the reading position.

5. In a weighing scale a rotary chart having a plurality of price graduation scales arranged side by side and a second set of price graduation scales of value varying from the first set and disposed side by side and following the first mentioned set, means for indicating adjacent each price scale the corresponding price per unit of weight, and means for varying the said price per unit of weight values to correspond with the different scale values of a different portion of the chart and means for concurrently shifting the chart angularly to bring the different portion aforesaid into reading position.

6. In a weighing scale, a chart, means for displacing the same in accordance with the applied weight, a plurality of price graduation scales upon said chart arranged side by side, a set of price graduation scales thereon arranged side by side, following the aforesaid first set and corresponding to different values per unit of weight, means for adjusting the chart to bring one or the other of said sets to reading position, and means for concurrently displaying adjacent the price scale an indication of the corresponding price values per unit of weight.

In testimony whereof I hereto affix my signature.

GEORGE R. WOOD.